(12) United States Patent
Corscadden et al.

(10) Patent No.: US 11,667,850 B2
(45) Date of Patent: *Jun. 6, 2023

(54) COMBINED PROCESS TO PRODUCE BOTH A PIPELINEABLE CRUDE AND CARBON FIBER FROM HEAVY HYDROCARBON

(71) Applicant: SUNCOR ENERGY INC., Calgary (CA)

(72) Inventors: Tom Corscadden, Calgary (CA); Darius Remesat, Calgary (CA); David Denton, Calgary (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/892,411

(22) Filed: Aug. 22, 2022

(65) Prior Publication Data
US 2022/0396738 A1    Dec. 15, 2022

Related U.S. Application Data

(63) Continuation of application No. 17/143,058, filed on Jan. 6, 2021, now Pat. No. 11,453,828, which is a (Continued)

(51) Int. Cl.
*C10G 21/00* (2006.01)
*C10G 55/04* (2006.01)
(Continued)

(52) U.S. Cl.
CPC ............ *C10G 21/003* (2013.01); *B01D 11/04* (2013.01); *C08L 95/00* (2013.01); *C10G 55/04* (2013.01); *C08L 2555/40* (2013.01)

(58) Field of Classification Search
CPC ........ C10G 21/003; C10G 55/04; C08L 95/00; C08L 2555/40; B01D 11/04
See application file for complete search history.

(56) References Cited

U.S. PATENT DOCUMENTS

| 2,715,603 A | 8/1955 | Lanning |
| 4,572,781 A | 2/1986 | Krasuk |

(Continued)

FOREIGN PATENT DOCUMENTS

| CN | 101591819 A | 1/2012 |
| FR | 2756841 A1 | 2/1999 |
| JP | 05139712 A | 6/1993 |

OTHER PUBLICATIONS

Eser, S. et al., 2019, "Properties of Fuels, Petroleum Pitch, Petroleum Coke, and Carbon Materials," in Fuels and Lubricants Handbook—Technology, Properties, Performance, and Testing (2nd Edition): (MNL 37-2nd-EB), edited by Totten et al, ASTM International, 1900 pp. (Year: 2019).*

*Primary Examiner* — Brian A McCaig
(74) *Attorney, Agent, or Firm* — Bradley Arant Boult Cummings; Timothy L. Capria; Alexandra C. Lynn

(57) ABSTRACT

An integrated process that is operated to create both a higher value pipelineable crude and a higher value carbon fiber product from a lower value common heavy hydrocarbon feedstock where the feedstock is processed in a thermal reactor followed by a solvent deasphalting unit with the liquids being gathered and processed to reduce olefins for pipeline transport and the solids are processed to generate a marketable carbon fiber product with any gases generated throughout the entire process reused in the process or sold.

24 Claims, 2 Drawing Sheets

Related U.S. Application Data continuation of application No. 16/247,807, filed on Jan. 15, 2019, now Pat. No. 10,920,153.

(51) Int. Cl.
 *B01D 11/04* (2006.01)
 *C08L 95/00* (2006.01)

(56) References Cited

U.S. PATENT DOCUMENTS

| | | |
|---|---|---|
| 4,781,819 A | 11/1988 | Chirinos |
| 5,149,517 A | 9/1992 | Fain |
| 2014/0175688 A1 | 6/2014 | Bohnert |

\* cited by examiner

UNITS:
20 = Feed preheater
30 = Thermal cracker
35 = Pre-conditioning carbon fiber feedstock (secondary thermal cracker)
40 = Olefin saturation
50 = Solvent deasphalting
55 = Secondary solvent deasphalting
60 = Inertial Separation
65 = Pre-conditioning carbon fiber feedstock
70 = Extrusion
80 = Spinning
90 = Heat Stabilization
100= Carbonization
105= Graphitization
110= Surface Treatment

COMBINED PROCESS TO PRODUCE BOTH A PIPELINEABLE CRUDE AND CARBON FIBER FROM HEAVY HYDROCARBON

FIELD OF THE INVENTION

The invention disclosed and claimed has to do with processing of heavy hydrocarbon feedstock such as Canadian bitumen (but any heavy hydrocarbon) to upgrade the feedstock to marketable and transportable products, such as blended crude oil suitable for transport by pipeline and value-added carbon fibre or carbon-fibre precursor materials. The invention is a type of hydrocarbon upgrading process or system.

PRIOR ART

The following discussion is meant to inform the reader of the state of the art in the realm of this invention.

U.S. Pat. No. 4,454,023 discloses a method that thermally cracks a heavy crude and solvent deasphalts the residue into a liquid pitch using a solvent process. A lower yield pipelineable crude product is created and the process creates a liquid phase asphaltene by-product that is then sent to a gasifier for combustion purposes.

U.S. Pat. No. 4,572,281 provides a process to generate solid asphaltenes post-solvent deasphalting from heavy hydrocarbon. The generation of the solid asphaltenes occurs at a different point in the process, the asphaltene solids are considered for combustion, and there is no mention of a pipelineable crude as a product.

U.S. Pat. Nos. 9,200,211 and 9,150,794 both disclose a method to generate pipelineable crude while producing a solid asphaltene product that is generated as a solid in the mixing portion of the solvent deasphalting step. However, these patents do not address anything beyond solid asphaltene products made in concert with the pipelineable heavy crude, and simply teach that the solid asphaltene material is good for use in combustion processes like gasification and for power production.

U.S. Pat. No. 7,101,499 shows an apparatus for producing pellets from hot heavy hydrocarbon or asphaltene that supplies the hot heavy hydrocarbon or asphaltene through a conduit to its outlet; and pellet producing medium or means that breaks up the liquid stream of the hot asphaltene flowing out of the outlet of the conduit and produces pellets of asphaltene. The feedstock in this patent is a liquid asphaltene teaching away from the a solid being fed to the extruding step.

U.S. patent application 2013/0036714 is a continuous process for fractioning, combining, and recombining asphalt sources into asphalt components for pelletization of asphalt and asphalt-containing products such that the pellets formed are generally uniform in dimension, freely flowing, free from agglomeration, and the pelletized asphalt is dried and/or packaged, and preferably compatibly packaged, for additional processing and applications. This patent requires a pre-pelletizing process (i.e. filtering) and a drying and/or packaging step. Also, the patent refers to the Asphalt as a solid or liquid requiring filtering and heating/cooling to obtain the necessary viscosity and consistency for feed to the pelletizer. The feedstock to the transport preparation step (i.e pelletizing) is essentially a liquid (with a softening point) teaching away from a solid particulate asphaltene product being generated in the asphaltene removal step.

U.S. Pat. No. 9,580,839 makes carbon fiber from asphaltenes obtained from heavy oil feedstocks undergoing upgrading in a continuous coking reactor. The liquid-phase asphaltene stream is mixed as the asphaltene stream travels horizontally from a first end of a continuous coking reactor. The process then takes the liquid-phase asphaltene stream through a filter to yield a purified asphaltene stream; introducing the purified asphaltene stream through a spinneret to yield carbon-based filaments; passing the carbon-based filaments through an inert gas stream to yield a carbon-based fiber; and collecting the carbon-based fiber on a draw-down device. The patent teaches away from using solid asphaltenes, as the feed to the spinneret is a liquid, and in addition does not produce a pipelineable crude from the process.

Applicant has found no patents or literature that disclose a common base process to treat or upgrade a heavy hydrocarbon to produce two higher valued products that include a pipelineable heavy crude and a carbon fiber and/or activated carbon.

SUMMARY OF THE INVENTION

It is to be understood that other aspects of the present invention will become readily apparent to those skilled in the art from the following detailed description, wherein various embodiments of the invention are shown and described by way of illustration.

As will be realized, the invention is capable for other and different embodiments and its several details are capable of modification in various other respects, all without departing from the spirit and scope of the present invention. Accordingly, the drawings and detailed description are to be regarded as illustrative in nature and not as restrictive.

In an embodiment, an integrated process is provided to produce both a pipelineable crude and a carbon fiber product from a common heavy hydrocarbon feedstock, where the feedstock is first processed in a thermal reactor and some of the product from the reactor is treated in a solvent deasphalting unit, with produced liquids being collected and mixed and further processed to reduce olefins, to produce a liquid crude stream for pipeline transport. From the same reactor product, asphaltene solids are also produced from the solvent deasphalting unit, and then further processed into a carbon fiber product, and gases generated at any portion of the entire process may be reused in the process or sold. This embodiment features the following specific ordered process steps:

a. Introducing heavy hydrocarbon feedstock to a heater and raising the feedstock's temperature to a desired range below the cracking temperature of the feedstock (600-660° F. (315.6-348.9° C.));

b. Sending the heated heavy hydrocarbon feedstock for processing to in a near atmospheric thermal reactor operating at an elevated uniform bulk liquid temperature of 700-790° F. (371.1-421.1° C.) for an in-reactor residence time (1 min to 7 hours) to create and produce a vaporized lighter heavy hydrocarbon stream from the reactor and a separate heavier liquid hydrocarbon stream from the reactor;

c. Condensing the lighter hydrocarbon stream produced from the reactor in step b);

d. Saturating olefins in the condensed lighter hydrocarbon stream from step c);

e. Mixing the heavier liquid hydrocarbon stream produced in step b) with a lighter hydrocarbon which acts as a solvent to precipitate asphaltene solid particulate (powder) which is and remains solid at operating conditions, creating and producing a solid/liquid mixture;

f. Separating the solid/liquid mixture produced in step e) into two streams: a solid/solvent slurry and a second heavy hydrocarbon liquid (resin)/solvent mixture;
g. Separating the heavy hydrocarbon liquid (resin)/solvent mixture produced in step f) into a heavy hydrocarbon stream and a solvent stream for reuse as required in process step e)
h. Mixing the heavy hydrocarbon stream produced in step g) with the condensed lighter hydrocarbon stream produced in step d) to create a pipelineable crude;
i. Separating solids from solvent in the solid/solvent slurry produced in step f) in a solid/vapor inertial separation unit, to produce a solvent-free solid asphaltene particulate (powder) stream and a vaporized solvent stream where the vaporized solvent is then condensed and reused as required in step e);
j. Adding a different solvent to the solid asphaltene powder in step i) to create and produce a reduced solid stream primarily consisting of coke, coke precursors and inorganic material and a second stream being a mixture comprised of the added different solvent and a reduced asphaltene solid particulate with coke, coke precursors and inorganic material removed;
k. Separating the solvent/asphaltene mixture produced in step j) to create and produce a stream of the different solvent which may be reused as required in step j) and a reduced asphaltene solid particulate stream;
l. Extruding the reduced asphaltene solid particulate produced in step k) into non-Newtonian flowing fluid producing extruded asphaltenes;
m. Spinning the extruded asphaltenes into continuous thread that can be wound on a spool;
n. Stabilizing the spooled asphaltene thread by heat treatment at 350-550° F. (176.7-287.8° C.) for up to 1 hour;
o. Carbonizing the stabilized asphaltene thread by heat treatment at 1832-3632° F. (1000-2000° C.) for up to 1 hour to produce a carbonized carbon fiber; and
p. Adding surface treatment and sizing the carbonized carbon fiber to create a general purpose carbon fiber product.

In another embodiment, the process has an additional intermediate process step before step j) to produce a higher quality carbon fiber with the following qualities:

Tensile strength of at least 1.5 GPa; and
Young modulus of at least 290 GPa, the added process being an additional solvent separation step to remove insolubles from the asphaltene powder solids in step i) which insoluble might hinder the formation of "marketable" carbon fiber thread.

In another embodiment of the process an additional step of flash separation, preferably under partial vacuum, is performed to remove lighter molecules from the asphaltenes before step j) in order to reduce the production of voids in the carbon fiber thread.

An additional step of graphitization may be added in yet another embodiment of the process after step m) to heat the carbon fiber to over 5432° F. (3000° C.) to produce a graphene product.

Another embodiment of the process includes an additional thermal cracking step after step b) but before step e) to generate more mesophase material to improve the characteristics of the carbon fiber product.

An apparatus is provided in an embodiment of the invention to perform the steps of the above process as an integrated process to create both a pipelineable crude and a carbon fiber product from a single crude feedstock. The apparatus includes:

a. Means to introduce heavy hydrocarbon feedstock to a heater to be raised to a desired temperature range below the cracking temperature of the feedstock (600-660° F. (315.6-348.9° C.));
b. Means to send and process the heated heavy hydrocarbon feedstock in a near atmospheric thermal reactor operating at an elevated uniform bulk liquid temperature of 700-790° F. (371.1-421.1° C.) for a desired residence time of between 1 min to 2 hours to produce a vaporized lighter heavy hydrocarbon stream from the reactor and a separate heavier liquid hydrocarbon stream from the reactor;
c. Means to receive and condense the lighter hydrocarbon stream in produced in b);
d. Means to saturate the olefins in the condensed lighter hydrocarbon stream condensed in c);
e. Means to mix the heavier liquid hydrocarbon stream produced in b) with a different lighter hydrocarbon acting as a solvent to precipitate asphaltene solid powder at operating conditions creating a solid/liquid mixture;
f. Means to separate the solid/liquid stream produced in e) into two streams, one a solid/solvent slurry, and a second heavy hydrocarbon liquid/solvent mixture;
g. Means to separate the heavy hydrocarbon liquid/solvent mixture produced in f) into a heavy hydrocarbon stream and a solvent stream that can be reused in e);
h. Means to mix the heavy hydrocarbon stream from g) with the lighter hydrocarbon stream from d) to create a pipelineable crude;
i. Means to separate the powder solids from the solvent in the solid/solvent slurry produced in f) in an inertial separation unit, creating a solvent-free solid asphaltene powder stream and a vaporized solvent stream where the solvent may be further condensed and reused in e);
j. Means to add a different solvent to the solid asphaltene powder in i) to create a reduced solid stream primarily consisting of coke, coke precursors and inorganic material and a second stream comprised of the added solvent and asphaltene solid mixture;
k. Means to separate the solvent/asphaltene mixture to create a re-usable stream of solvent for use in j) and a reduced asphaltene solid stream;
l. Means to extrude the asphaltene solids produced in k) into a non-Newtonian flowing fluid producing extruded asphaltenes;
m. Means to spin the extruded asphaltenes into a continuous thread that can be wound on a spool;
n. Means to stabilize the asphaltene-based thread at 400-500° F. (204.4-260° C.) for up to an hour;
o. Means to carbonize the stabilized asphaltene thread at 1832-3632° F. (1000-2000° C.) for up to an hour; and
p. Means to add surface treatment and size the carbonized asphaltene-based carbon fiber to create a marketable general purpose carbon fiber product.

The apparatus may also include an additional solvent separation means to remove insolubles from the asphaltene powder solids from i) that might hinder formation of "marketable" carbon fiber thread; similarly, the apparatus may include means to provide an additional step of flash separation, preferably under partial vacuum, to remove lighter molecules from the asphaltenes to reduce the formation of voids in the carbon fiber thread. Additional means to provide graphitization may be added after step m) for heating the carbon fiber to over 5432° F. (3000° C.) to produce a graphene product, and means to provide an additional thermal cracking step may be included after b) but before e) to generate more mesophase material to improve the characteristics of the carbon fiber product.

An integrated process is provided which is operated to create both a higher value pipelineable crude and a high value carbon fiber product from a lower value common heavy hydrocarbon feedstock such as bitumen, where the feedstock is processed in a thermal reactor followed by a deasphalting step in a solvent deasphalting (SDA) unit, with liquids produced in the reactor and SDA being gathered and processed to reduce olefins and blended to make a crude liquid product for pipeline transport, and with the asphaltene solids produced from the SDA being processed to generate a marketable carbon fiber product, and with any gases generated throughout the entire process reused in the process or sold.

Pipelineable crude is defined as a crude that meets current pipeline specifications of greater than API 19 (density <920 kg/m3), viscosity less than 300 cSt at reference temperature, sediment and water less than 0.5 wt % and olefins less than 1 wt % or non-detectable by the measurement tool used by the transporter.

Carbon fiber is defined as a fiber containing at least 92 wt % carbon. Carbon fibers generally have excellent tensile properties, low densities, high thermal and chemical stabilities in the absence of oxidizing agents, good thermal and electrical conductivities, and excellent creep resistance. They have been extensively used in composites in the form of woven textiles, continuous fibers/rovings, and chopped fibers for making manufactured goods. The composite parts can be produced through filament winding, tape winding, pultrusion, compression molding, vacuum bagging, liquid molding, and injection molding. This process creates both a pipelineable crude and commercial quality carbon fiber product.

DETAILED DESCRIPTION

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

Figure 1:
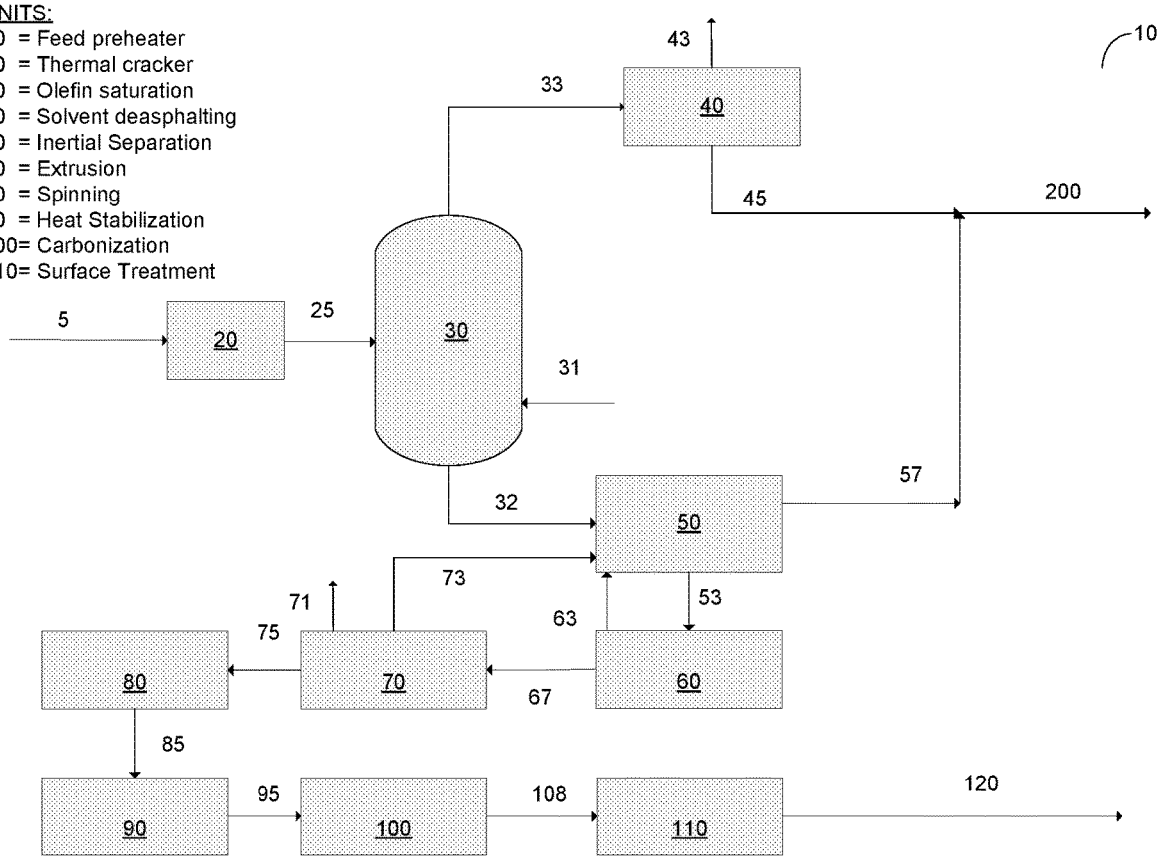
FIG. 1 is a block diagram or flow-chart of the integrated process of the invention.

FIG. 1 is a process flow diagram depicting a process 10 for forming a hydrocarbon liquid product 200, that meets pipeline specification and a carbon fiber product 120 from a common heavy hydrocarbon feedstock 5 that cannot itself be shipped by pipeline without treatment or modification. The final hydrocarbon product 200 has sufficient characteristics to meet minimum pipeline transportation requirements (minimum API gravity of 19, at least 350 cSt at 7.5° C., less than 0.5 wt % sediment and water and olefins less than 1 wt % (or non-detectable)) and is a favourable refinery feedstock while the final solid product 120 has sufficient characteristics to be used in general purpose and high performance carbon fiber products. Process 10 is designed to use over 95 wt % of the heavy hydrocarbon feedstock with over 83 wt % used as a pipelineable crude and over 12 wt % as carbon fiber.

As shown in FIG. 1, a heavy hydrocarbon feedstock 5, that can't be shipped via pipeline, can be routed through a heater 20 to heat the material to a desired temperature level and sent as stream 25 to a reactor 30 where the process fluid temperature is controlled and maintained while it undergoes a mild controlled cracking process. Sweep gas, 31, can be introduced into the reactor to assist in mixing the liquid pool in the reactor and to assist in removing any evolved vapours from the hydrocarbon feedstock. The sweep gas can be any type of non-condensable vapour that can end up in the fuel gas system for combustion or reuse in the process. Examples of sweep gas can be a hydrocarbon mixture such as natural gas or steam, nitrogen or hydrogen. After the mild cracking process, a light top fraction 33 can be routed from the reactor 30 to a gas liquid condensing separator and olefin saturation process 40 with a heavy bottom fraction 32 routed to a liquid/solid solvent extraction process 50. The condensed overhead liquid fraction 33 will have a much higher API gravity than the bottom fraction 32. For example, the overhead liquid fraction 33 could typically have an API gravity of 26 or greater.

An olefin saturation process 40 takes the vapour stream 33 from the reactor 30 to convert the olefins in this stream to meet pipeline transport specification. The condensed olefin-saturated liquid exits unit 40 as stream 45 and can be blended into the final product, 200. Any non-condensable vapour exits as stream 43 and can be sent to an $H_2S$ removal unit, such as an amine unit, so vapour can be readily reused in the process or used as a fuel gas.

Stream 32 from the reactor 30 is fed to the solvent deasphalting unit 50. The solvent extraction process 50 can comprise any suitable solvent extraction process that can handle the separation of precipitated solids at operating conditions from the remaining hydrocarbon liquid. An example of a relevant solid-liquid solvent separation process is U.S. Pat. No. 9,976,093 and Canada patent 2,844,000. A recycled solvent stream 63, 73 may be mixed with stream 32 to precipitate a solid asphaltene phase from the liquid 32 stream. Additional makeup solvent may be required to mix with stream 32 in separator 50. The asphaltenes precipitated are a solid powder so a solid/liquid separation can now be made as opposed to the typical liquid/liquid separation. A solid/liquid separation requires less solvent to provide the desired recovery of pipelineable heavy oil. A heavy deasphalted oil leaves the SDA unit, 50, as stream 57. Stream 57 is blended with stream 45 to create the final product, 200, which has physical characteristics which enable it to meet required pipeline transport criteria without having to mix the final hydrocarbon with transport diluents. The solvent used in SDA 50 can be a pure hydrocarbon component ideally in the range of $C_6$ to $C_8$ or more practically, a mixture of $C_5$ to $C_8$ extracted from readily available natural gas condensate or diluent that comes in with the heavy crude feed.

Stream 53 contains entrained solid asphaltene powder in a solvent liquid phase. Stream 53 is reduced in pressure to flash the solvent to create a vapor/solid mixture as a slurry or suspension that enters the inertial separation unit (ISU), 60, for a solid/vapour separation. Solvent vapour is condensed and returned to the SDA unit 50 for reuse as stream 63. The asphaltene solid powder leaves the ISU as stream 67 and enters an extruder to apply pressure to the solid asphaltenes to remove any remaining entrained solvent. The extruder temperature can be in the 200-350° C. range to create conditions to provide continuous flow as a Non- Newtonian fluid through and out of the equipment. The removed solvent is returned to the SDA unit as stream 73. Some of the generated asphaltene extrudate can be segregated and sent to the solid fuels market, as stream 71, if the market for carbon fiber is saturated or not economic. As another embodiment, material in stream 71 can be sent to for processing to become activated carbon. The majority of the extruded asphaltenes leave the extruding unit, 70, as stream 75 and is fed to the spinning unit, 80, where "green" carbon fiber is produced as stream 85. "Green" fiber is a term used for hydrocarbon crude derived fiber that has yet to be oxidized or carbonized, and is extremely fragile.) The spinning of the "green" fiber can be accomplished by either melt or jet spinning. Ideally, the diameter of the "green" fiber is less than 15 um, preferably less than 10 um for commercial applications.

The "green" fiber is then stabilized in unit 90. Stabilization is accomplished by heating the fibers in a forced air environment to provide sufficient fresh oxygen to the fiber surfaces air at temperatures in the range of 200-300° C. Heating causes the spun fibers to pick up oxygen molecules on their surfaces to prevent the onset of inter-fiber coalescence or melting and to promote good carbon yield in later carbonization. Stabilization can take between a few minutes up to an hour or two. The stabilized fiber, stream 95, is then carbonized, in unit 100, under an inert environment (no oxygen) and is heated uniformly up to approximately 1000° C., but can go up to 1800° C. to improve both the fiber strength and Young modulus. The carbonizing step can take between a minute to up to an hour or two depending on the final properties desired. The lack of oxygen prevents the fibers from burning in the very high temperatures. As the fibers are heated, they begin to lose their non-carbon atoms, plus a few carbon atoms, in the form of various gases including water vapor, ammonia, carbon monoxide, carbon dioxide, hydrogen, nitrogen, sulfur, evolved metals such as nickel and vanadium and others. As the non-carbon atoms are expelled, the remaining carbon atoms form tightly bonded carbon crystals that are aligned more or less parallel to the long axis of the fiber. In a variant of this process, two furnaces operating at two different temperatures are used to better control the rate of heating during carbonization. The carbonized fiber leaves as stream 108 and can have surface treatment and sizing applied in unit 110. Surface treatment and sizing methods mainly used are acid oxidation, resin addition, plasma treatment, rare earth treatment, and/or gamma irradiation. Surface treatment leads to improved composite properties due to the conditions of improved surface area of the fiber surface, chemical bonding and adhesion between fiber and matrix. Surface treating and sizing is typically used since after carbonizing, the fibers have a surface that does not bond well with epoxies and other materials used in composite materials. To give the fibers better bonding properties, their surface is slightly oxidized. The addition of oxygen atoms to the surface provides better chemical bonding properties and also etches and roughens the surface for better mechanical bonding properties. Oxidation can be achieved by immersing the fibers in various gases such as air, carbon dioxide, or ozone; or in various liquids such as sodium hypochlorite or nitric acid. The fibers can also be coated electrolytically by making the fibers the positive terminal in a bath filled with various electrically conductive materials. The surface treatment process must be carefully controlled to avoid forming tiny surface defects, such as pits, which could cause fiber failure.

The final carbon fiber product, stream 120, is normally general purpose (GP) carbon fiber. This product, 120, has a higher value than either the hydrocarbon feedstock, 5, or the typical disposition for asphaltenes, as a solid fuel.

As an additional embodiment to FIG. 1, After the surface treatment, the fibers can be coated to protect them from damage during winding or weaving. This process is called sizing. Coating materials are chosen to be compatible with the adhesive used to form composite materials. Typical coating materials include epoxy, polyester, nylon, urethane, and others.

The coated fibers are wound onto cylinders called bobbins. The bobbins are loaded into a spinning machine and the fibers are twisted into yarns of various sizes.

Figure 2:
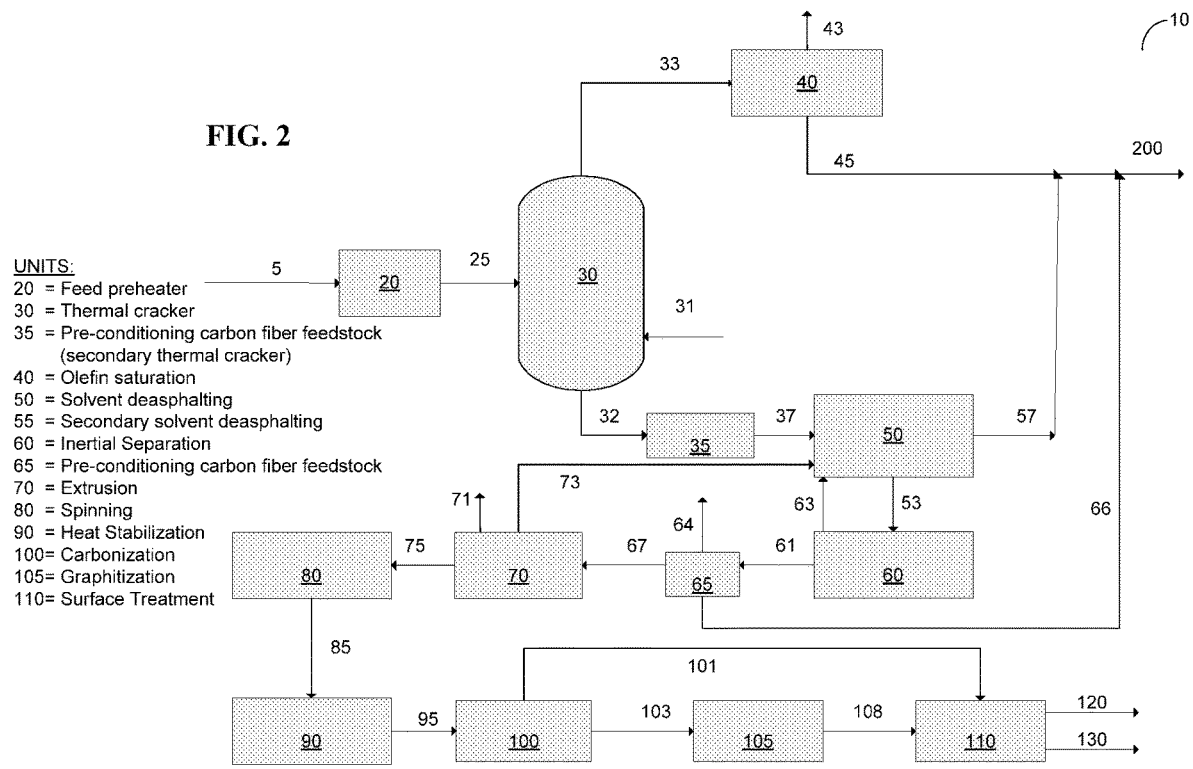
FIG. 2 is a block diagram or flow-chart of a second embodiment of the integrated process of the invention.

Another embodiment, shown in FIG. 2 provides modification options to the process shown in FIG. 1 and described above in order to create an option for production of high performance carbon fibers along with general purpose carbon fiber and pipelineable crude. Unit 35 can be added to provide additional thermal cracking to the residue portion of the crude to generate more mesophase material from the thermally affected asphaltene solid powder for the feed to the SDA, 50, as stream 37. Mesophase content is a contributor to high performance carbon fiber.

Unit 65 can be added to perform further treatment and separation of the asphaltene solids. Stream 64 is undesirable solids that hinder the generation of carbon fiber while stream 66 contains flowable hydrocarbon that create voids in the carbon fiber. The material in stream 66 can be added to the hydrocarbon liquid product stream, 200, if the pipeline specifications can be maintained. Otherwise, stream 66 can be recycled to unit 30 for re-processing. Stream 64 can contain coke particles generated in reactor 30 and/or inorganic material in the feed. Unit 65 can contain a second solvent deasphalting step using organic solvents that adsorb heavier molecules than what is used in SDA unit, 50. The solvents that could be used to reject the heaviest, most undesirable solids in the solid asphaltene powder mixture are essentially heterocyclic hydrocarbon based compounds such as toluene, xylene, benzene, tetrahydrofuran, cyclohexanone, quinoline and pyridine among others. Vacuum distillation can also be used in unit 65, alone or in combination with a second deasphalting step, to remove any remaining lighter molecules that could create voids in the carbon fiber. Any lighter material evolved in the vacuum distillation or similar process will end up as stream 66. In addition, sparging can be considered within unit 65 to produce more mesophase material by removing lighter components and altering the orientation of the carbon molecules to promote high performance carbon fiber in stream 130. Sparging is a process similar to air blowing, and for carbon fiber, it is normally conducted with inert nitrogen instead of air.

Carbon fibers can be graphitized in unit 105 after carbonization in unit 100 at temperatures close to 3,000° C. in an non-oxygen environment for improved Young's modulus. This step can create high performance carbon fibers with tensile strength above 1.5 GPA (preferably above 3 GPa) and Young's modulus above 290 GPA, up to 500 GPa. Stream 103 from unit 100 is directed for graphitization in unit 105, while stream 101 is directly set to the final step of surface treatment to create general purpose carbon fiber. The material leaving unit 105, graphitization, as stream 108, will be high performance carbon fiber, stream 130, after surface treatment is performed in unit 110.

In one aspect, the feedstock 5 can be a heavy hydrocarbon (virgin or a previously processed stream), such as the heavy hydrocarbon obtained from a SAGD (steam assisted gravity drainage) process, for example Canadian Oil sands bitumen, or from any other suitable source of heavy hydrocarbon. In another aspect, the feedstock 5 can have an API gravity in the range of 0 to 14.

The thermal cracker, 30, in FIGS. 1 and 30 and 35 in FIG. 2, is operated at conditions that maximize the economic return for producing both pipelineable crude, 200, and carbon fiber products, 120 and 130. In one aspect, the heater 20 will heat the process fluid 5 to a temperature between 675-790° F. (357.2-421.1° C.). before the process fluid 25 is introduced into the reactor 30. In the reactor 30, the process fluid 25 (heated to 675-790° F. (357.2-421.1° C.) by the heater 20) undergoes a mild controlled cracking process. Appropriately located heaters are provided in this reactor 30 to maintain the desired constant temperature generated in heater 20 and to apply uniform heat flux for the fluid. The heaters provide indirect heat through any source readily available (electric, heat transfer fluid, radiant etc.). To ensure a uniform heat flux, mixing can be applied to the process fluid on a continuous or intermittent basis.

The reactor 30 can be operated in a manner, through optimizing primarily five inter-related process variables (Temperature, Pressure, Residence Time, Sweep Gas and Heat Flux), so as to reduce or even prevent coke from forming during the reaction, and minimizing gas production, while also providing optimal conversion of the asphaltene portion of the heavy hydrocarbon to provide the desired mix of refinery-ready feedstock components through pipelineable crude and carbon fiber products.

The first and second variables involve applying a uniform heat flux between 7000-12000 BTU/hr sq.ft (22.1-37.8KW/m$^2$) to the entire pool of process fluid in the reactor and maintaining a single operating temperature in the reactor between 675-790° F. (357.2-421.1° C.). This may be achieved by the presence of appropriately sized and located heating devices in the reactor. The number of heaters will be set by calculating the optimal dispersion of heat between any two heaters so as to have a uniform temperature throughout the pool and to avoid peak or spot temperatures significantly higher than the target temperature in the reactor. Avoiding peak temperature spots reducing the chance for generating coke in the reactor.

The third reactor variable, residence time, can be between 5 up to 7 hours minutes in the reactor. AS the residence time is increased, the conversion of 975+° F. (523.9+° C.) material to 975° F. (523.9+° C.) material increases and the expected concentration of mesophase material increases.

The fourth reactor variable, operating pressure, can be maintained at near atmospheric pressure, in any case, to be less than 50 psig (345 kPa), with standard pressure control principles used for consistent performance. The pressure range is controlled on the low end to prevent excessive, premature flashing of hydrocarbon, essentially bypassing the reactor, and limited on the high end to reduce secondary cracking and consequent increased gas yields.

The fifth reactor variable, sweep gas 31, may be added to the process fluid in the reactor 30 in the range of 0-80 scf/bbl (0-14.24 Sm$^3$/Sm$^3$) if deemed beneficial to improving the reactor performance.

The sweep gas 31 can be natural gas, hydrogen, produced/fuel gas from the process, steam, nitrogen or any other non-reactive, non-condensable gas that will not condense to a liquid.

Sweep gas in the dosage of 0-80 scf/bbl (0-14.24 Sm$^3$/Sm$^3$) of feed may be provided to remove the "lighter" hydrocarbon products (i.e. methane to <750° F. (398.9° C.)) boiling point hydrocarbons) as soon as they are formed in the reactor 30 so that there is a minimum of secondary cracking which could increase gas make and potentially increase olefinic naphtha/distillate production. The sweep gas may also allow the reactor to operate closer to the desired operating pressure (<50 psig (345 kPa)) and temperature. The sweep gas 31 can also be used to provide additional heat and/or mixing to the process fluid 14 in the reactor 30.

Each variable may be changed independently, within the ranges suggested, based on the quality of feedstock provided or based on the quality and quantity of each output desired. Since the 5 noted process variables are inter-related, a multi-variable process control scheme with a prescribed objective function (maximum yield to meet minimum product specifications) will be beneficial to ensure the process operates at an optimal point when any one of the variables is changed or the feed/product situation is altered.

The overhead fraction 32 can be directed to a gas liquid separation unit 40, which can comprise a cooler and separation drum, as an example, in which a portion of the overhead fraction 32 that is a condensable liquid product containing naphtha and heavier hydrocarbons can be separated from the gaseous components of the overhead fraction 32. An off-gas line 43 containing undesirable gases such as sour gas, can be provided at the separation drum in unit 40 (not shown) for those gases to be disposed of, recycled, or subjected to further treatment.

One or more liquid hydrocarbon streams can be produced from separation drum (not shown, but in 40).

The bottom fraction 32 can contain hydrocarbons, and thermally modified asphaltenes. Although the characteristics of the bottom fraction 32 taken from the reactor 30 will vary depending on the process fluid 25 input into the reactor 30 and the reactor's operating parameters, in one aspect the bottom fraction 32 can have an API gravity ranging between −5 and 5.

Controllable process variables allow an operator to vary the performance of the reactor 30 to meet the needs of the final product based on changing characteristics of the incoming process fluid 25.

The controllability of the five inter-related variables, residence time, sweep gas, heat flux, temperature and pressure in the reactor 30 allow an operator to vary the performance of the reactor 30.

In this manner, when the characteristics of the feedstock 5 are changed the five inter-related process variables can be optimized to avoid the production of coke and minimize the production of non-condensable vapors which are produced in the reactor 30. For example, the operator can vary the residence time of the process fluid in the reactor 30 based on the characteristics of the process fluid to obtain the desired yields and/or quality of the bottoms output 32, and the overhead output, 33. Alternatively, the operator can vary the sweep gas, temperature or pressure to achieve similar outcomes. The process variables are inter-related and the minimization of coke and avoidance of excess gas make is challenging and is best determined by pilot operations.

The reactor 30 is operated in a manner that significantly limits and even prevents the formation of coke and reduces gas production while converting asphaltenes into more suitable components for downstream processing. Consequently, modified asphaltenes and other heavy components remain in the bottom fraction 32 that is removed from the reactor 30. To maximize the recovery of the desirable refinery feedstock crude and to separate heavy components for carbon fiber production, the bottom fraction 32 from the reactor 30 must be further treated using, for example, a high performance solvent extraction process 50. The treatment of the bottom fraction 32 by solvent extraction process 50 allows the reactor 30 and the solvent extraction process 50 to be used in conjunction, to produce a suitable full range refinery feedstock crude transported via pipeline without the need for transport diluent and a solid asphaltene product for carbon fiber production which can involve the following steps: extrusion, melt spinning, stabilization, carbonization, graphitization, surface treatment, and/or sizing. As stated previously, optional thermal conditioning in Unit 35, and optional solvent deasphalting in Unit 55, can be employed to generate different quality crude and carbon fiber products.

EXAMPLE 250 lbs/hr (113.4 kg/hr) of diluted bitumen at 22.4 API (918.8 kg/m$^3$) (stream 5 in FIG. 1 or 2) were processed at a 15 barrel/day (2.4 m$^3$/day) dilbit feed pilot plant. The diluent was removed from the bitumen and 170.6 lbs/hr (77.4 kg/hr) of bitumen (stream 25 in FIG. 1 or 2) was fed to the thermal reactor. The bitumen has an API of 7.7 API (1015.5 kg/m$^3$). 141.6 lbs/hr (64.4 kg/hr) of pipelineable crude (stream 200 in FIG. 1 or 2) was produced at 19.1 API (938.5 kg/m$^3$), 270 cSt, less than 0.5 wt % olefins, and less than 0.5 wt % sediment and water. The processed crude product meets pipeline specification. Of note, the processed crude measured a micro-carbon residue (MCR) of less than 6 wt %. 21.3 bls/hr (9.66 kg/hr) of 10-15 um diameter general purpose carbon fiber (stream 120 in FIG. 1 or 2) was created with a young Modulus of over 28 GPa and ultimate strength of over 170 MPa. Approximately 4.3 lbs/hr (1.95 kg/hr) of solid material (stream 64 in FIG. 2) was created that can be used in the solid fuels market, and 3.4 lbs/hr (1.54 kg/hr) of fuel gas (stream 43 in FIG. 1 or 2) was generated for reusing in the process.

Definitions

Carbon fiber—Fiber containing at least 92 wt % carbon, while the fiber containing at least 99 wt % carbon is usually called a graphite fiber.

General purpose carbon fiber—Carbon fibers that have relatively low tensile strength (less than 1 GPa) and low modulus (less than 100 GPa) respectively. Isotropic-pitch-based carbon fibers belong to this grade and are used in applications that benefit from their low weight and bulkiness, e.g. thermal insulation for a high-temperature furnace, cement reinforcement and activated carbon fiber applications).

Graphene—Graphene is an atomic-scale hexagonal lattice made of a single layer of carbon atoms. It is the basic structural element of many other allotropes of carbon, such as graphite, diamond, charcoal, carbon nanotubes and fullerenes.

Insolubles—Material that precipitates into or remains in the solid form when mixed with a solvent.

Mesophase—A phase of matter intermediate between a liquid and solid, referred to as liquid crystals.

Non-Newtonian fluid— A fluid that its viscosity (the gradual deformation by shear or tensile stresses) is dependent on shear rate or shear rate history. A Non-Newtonian fluid's viscosity can change when under force to either more liquid or more solid.

Pipelineable crude—Heavy hydrocarbon with API less than or equal to 19 (density >920 kg/m3), and/or more than 300 cst that requires some processing to meet pipeline specifications of greater than API 19 (density <920 kg/m3), viscosity less than 300 cSt at reference temperature, sediment and water less than 0.4 wt % and olefins less than 1 wt % or non-detectable by the measurement tool used by the transporter.

Transport hydrocarbon—Diluent, condensate, hydrocarbon with Boiling range of butane to 550° F. nominally Tensile strength—Measure of the amount of force with which a fiber can be pulled before it breaks.

Young's modulus—Measure of a material's stiffness defined as the axial stress divided by the axial strain. The higher the modulus, the stiffer the material (i.e. the greater the stress necessary to cause deformation).

What is claimed is:

1. A process for treating a heavy hydrocarbon feedstock, comprising:
    thermally treating the hydrocarbon feedstock to produce a lighter hydrocarbon stream and a heavier hydrocarbon stream;
    solvent deasphalting the heavier hydrocarbon stream with a solvent to precipitate asphaltenes and form solid asphaltene precipitates and produce deasphalted oil;
    separating the deasphalted oil from the solid asphaltene precipitates to produce a solvent-diluted deasphalted oil stream comprising a portion of the solvent and a slurry stream comprising the asphaltene precipitates and residual solvent;
    separating the solvent-diluted deasphalted oil stream to produce a recovered solvent stream and a deasphalted oil stream;
    separating the slurry stream to produce a solid asphaltene particulate stream and a recovered solvent stream; and
    processing the solid asphaltene particulate stream to produce a carbon fiber precursor.

2. The process of claim 1, wherein separating the slurry stream comprises vaporizing the residual solvent to produce a vapour/solid mixture comprising vaporized solvent and the solid asphaltene precipitates, and subjecting the vapour/solid mixture to inertial separation.

3. The process of claim 1, wherein processing the solid asphaltene particulate stream comprises extruding the solid asphaltene particulate stream to produce extruded asphaltenes as the carbon fiber precursor.

4. The process of claim 3, further comprising:
    spinning the extruded asphaltenes into an asphaltene thread woundable on a spool;
    stabilizing the asphaltene thread by a first heat treatment to produce a stabilized asphaltene thread;
    carbonizing the stabilized asphaltene thread by a second heat treatment to produce a carbonized carbon fiber; and
    conditioning the carbonized carbon fiber to produce a carbon fiber product.

5. The process of claim 3, further comprising graphitizating the carbon fiber precursor to produce a graphene product.

6. The process of claim 3, further comprising:
    spinning the extruded asphaltenes into an asphaltene thread; and
    spooling the asphaltene thread to obtain a spooled asphaltene thread having a diameter of below 15 μm and has less than 10% void space.

7. The process of claim 1, wherein the carbon fiber precursor is converted into a carbon fiber product having a tensile strength of at least 150 MPa and a young modulus of at least 20 GPa.

8. The process of claim 1, further comprising, prior to the processing of the solid asphaltene particulate stream, separating insolubles from the solid asphaltene particulate stream, wherein separating the insolubles comprises combining the solid asphaltene particulate stream with an insolubles-producing solvent to produce the insolubles and removing the insolubles from the solid asphaltene particulate stream.

9. The process of claim 8, wherein the insolubles-producing solvent comprises a heterocyclic hydrocarbon.

10. The process of claim 1, wherein the solvent used for the solvent deasphalting comprises one or more of $C_5$-$C_8$ hydrocarbons.

11. The process of claim 1, wherein the carbon fiber precursor is converted to activated carbon.

12. A process for treating a heavy hydrocarbon feedstock, comprising:
   solvent deasphalting the heavy hydrocarbon feedstock with a solvent to precipitate asphaltenes and form solid asphaltene precipitates and produce deasphalted oil;
   separating the deasphalted oil from the solid asphaltene precipitates to produce a solvent-diluted deasphalted oil stream comprising a portion of the solvent and a slurry stream comprising the asphaltene precipitates and residual solvent;
   separating the solvent-diluted deasphalted oil stream to produce a recovered solvent stream and a deasphalted oil stream;
   separating the slurry stream to produce a solid asphaltene particulate stream and a recovered solvent stream; and
   processing the solid asphaltene particulate stream to produce a carbon fiber precursor.

13. The process of claim 12, wherein separating the slurry stream comprises vaporizing the residual solvent to produce a vapour/solid mixture comprising vaporized solvent and the solid asphaltene precipitates, and subjecting the vapour/solid mixture to inertial separation.

14. The process of claim 12, wherein processing the solid asphaltene particulate stream comprises extruding the solid asphaltene particulate stream to produce extruded asphaltenes as the carbon fiber precursor.

15. The process of claim 14, further comprising:
   spinning the extruded asphaltenes into an asphaltene thread woundable on a spool;
   stabilizing the asphaltene thread by a first heat treatment to produce a stabilized asphaltene thread;
   carbonizing the stabilized asphaltene thread by a second heat treatment to produce a carbonized carbon fiber; and
   conditioning the carbonized carbon fiber to produce a carbon fiber product, wherein the conditioning comprises surface treating and sizing the carbonized carbon fiber.

16. The process of claim 14, further comprising graphitizating the carbon fiber precursor to produce a graphene product.

17. The process of claim 14, further comprising:
   spinning the extruded asphaltenes into an asphaltene thread; and
   spooling the asphaltene thread to obtain a spooled asphaltene thread, wherein the spooled asphaltene thread has a diameter of below 15 μm and has less than 10% void space.

18. The process of claim 12, wherein the carbon fiber precursor is converted to activated carbon.

19. A process for producing a carbon fiber precursor, comprising:
   solvent deasphalting a hydrocarbon feedstock with a first solvent to precipitate asphaltenes and form solid asphaltene precipitates and produce deasphalted oil;
   separating the deasphalted oil from the solid asphaltene precipitates to produce a solvent-diluted deasphalted oil stream comprising a portion of the solvent and a slurry stream comprising the asphaltene precipitates and residual solvent;
   separating the slurry stream to produce a solid asphaltene particulate stream and a recovered solvent stream;
   solvent deasphalting the solid asphaltene particulate stream with a second solvent, different from the first solvent, to precipitate insolubles contained in the solid asphaltene particulate stream;
   separating the insolubles from the solid asphaltene particulate stream; and
   processing the solid asphaltene particulate stream to produce the carbon fiber precursor.

20. The process of claim 19, wherein the first solvent comprises a mixture of $C_5$-$C_8$ hydrocarbons.

21. The process of claim 19, wherein the second solvent comprises a heterocyclic hydrocarbon.

22. The process of claim 19, wherein the second solvent comprises one or more of toluene, xylene, benzene, tetrahydrofuran, cyclohexanone, quinoline or pyridine.

23. The process of claim 19, further comprising subjecting the solid asphaltene particulate stream to sparging to remove lighter components prior to processing the solid asphaltene particulate stream to produce the carbon fiber precursor.

24. The process of claim 19, further comprising subjecting the solid asphaltene particulate stream to vacuum distillation to remove lighter components prior to processing the solid asphaltene particulate stream to produce the carbon fiber precursor.

* * * * *